3,171,959
APPARATUS FOR MEASURING OBJECTS WITHIN MATTER OPAQUE TO VISIBLE LIGHT
Oscar K. Kozek, 1313 Pleasant Drive, and Parmalee M. Brown, 1728 19th St., both of West Des Moines, Iowa
Filed Aug. 6, 1962, Ser. No. 214,912
3 Claims. (Cl. 250—53)

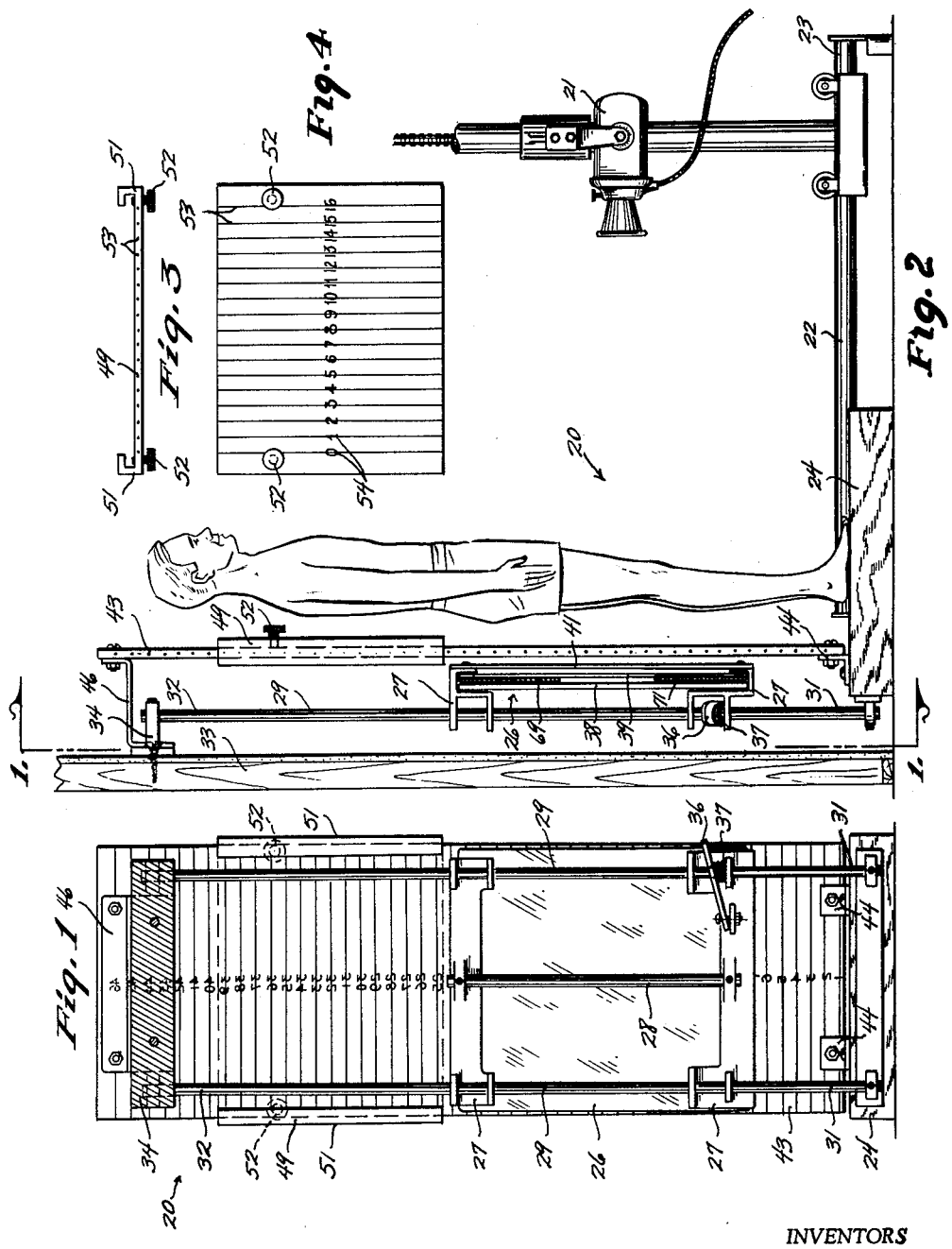

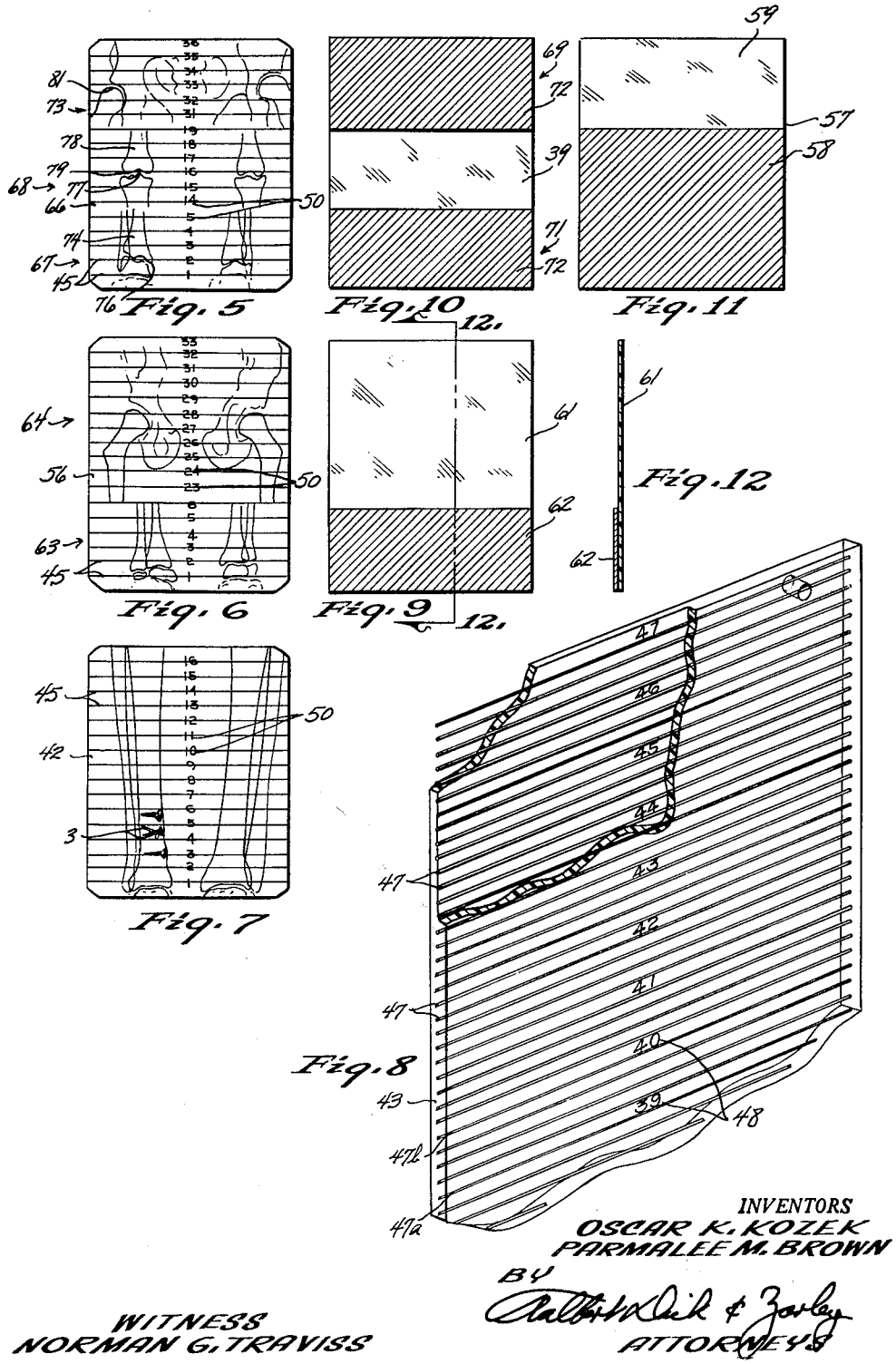

This invention relates to the measurement of objects within matter opaque to visible light, and more particularly to apparatus for measuring objects unobservable to the naked eye.

The utilization of X-ray equipment, whether in the production of radiographs or in the exhibition of fluorescence of a body, is well known. Also, measurement of impressions produced by X-ray film is possible by using known measuring devices. The invention, however, has as a primary object the use of new and novel apparatus in combination with X-ray equipment and the like for providing exact and accurate measurement of inaccessible regions of the body.

It is an object, therefore, of this invention to provide apparatus for accurate measurement of an object within matter opaque to visible light.

Another object of this invention is to provide an apparatus useable in combination with X-ray equipment or the like for producing indicia of measurement during the exhibition of the X-rays.

Yet another object of this invention is to provide an apparatus useable in combination with X-ray equipment for producing ruled markings and indicia of measurement therefor during exhibition of the X-rays.

It is another object of this invention to provide apparatus useable in combination with X-ray equipment or the like for exhibiting on one X-ray film ruled markings of known measurement and sufficient images of objects of a length longer than the X-ray film for immediately indicating the dimensions of the objects.

Another object of the invention is to provide a panel of material transparent for mounting between the X-ray emitting device and the X-ray receiving device, the panel supporting a plurality of ruled markings and measurement indicia therefor opaque to X-rays, whereby upon exhibition of the X-rays, objects transparent to the X-rays are readily and accurately measurable.

Yet another object of this invention is to provide an apparatus capable of attaining the above designated objectives which is economical to manufacture, simple of construction, and effective in use.

These objects and other features and advantages of this invention will become readily apparent upon reference to the following description and the accompanying drawings, wherein:

FIG. 1 is a rear elevational view of a preferred embodiment of our invention;

FIG. 2 is a side elevational view of the apparatus of our invention, shown in use with a patient;

FIG. 3 is a plan view of a vertical slide;

FIG. 4 is a front view of the slide;

FIGS. 5, 6 and 7 are different X-rays showing different impressions taken of objects and using our apparatus;

FIG. 8 is an enlarged fragmentary perspective view of a panel, broken away for clarity of illustration;

FIGS. 9, 10 and 11 are different plates useable as a part of our apparatus; and

FIG. 12 is a sectional view taken along the line 12—12 of FIG. 9.

Referring now to the drawings, our apparatus is indicated generally at 20 in FIG. 2 and includes an X-ray tube device 21 movably mounted on a rail 22 or the like supported at one end 23 on the floor and at the other end on a platform 24 on which the patient or person being examined stands.

Behind and on a side of the person opposite to the tube device 21 is a cassette 26 (see FIGS. 1 and 2) which includes a pair of brackets 27 interconnected by a bar 28 (FIG. 1) and slidably mounted on a pair of upstanding rods 29. The rods 29 are secured at their lower ends 31 to the platform 24 and at their upper ends 32 to the wall 33 by means of a fastening device 34.

The cassette 26 is vertically movable on the rods 29 and may assume any vertically adjusted position by means of a friction brake arm 36 and spring 37 of known construction. Adapted to be supported within the cassette 26 in X-ray film pack 38 of a commercial type, and a plastic sheet 39 (FIG. 10), and with a filter screen 41 secured to and integral with the cassette 26.

The film pack 38 includes a film 42 (FIG. 7) which, when exposed exhibits an image of, for example, the bone structure of the person's legs, and any foreign objects therein such as the screws 3 illustrated in FIG. 7. It is understood that the bones and screws are objects within matter such as the legs of the person, which legs are opaque to visible light rays, but which are transparent to electromagnetic waves of short length commonly called X-rays. The bones and screws are opaque to the X-rays and thus show on the exposed, finished film 42 (FIG. 7).

Adapted to be inserted between the X-ray tube device 21 and the film carrying cassette 26 is a panel 43 of plastic material, such as plexiglass, or of any material transparent to X-rays. The panel 43 is mounted directly in front of the cassette 26 in an upstandnig, vertically disposed position, held at its bottom by a pair of brackets 44 to the platform 24, and at its top by a bracket 46 to the fastening device 34.

Supported within the panel 43, as best shown in FIG. 8, are a plurality of straight metallic rods 47 opaque to the X-rays. The rods 47 are horizontally disposed in a parallel, equally spaced arrangement, each rod 47 being one-quarter of an inch from the next adjacent rod 47 on either side thereof. To expedite the reading of measurements, as determined by the rods in a manner hereinafter described, indicia in the form of consecutive numbers 48 are placed in a superimposed relationship with every fourth rod 47, thereby indicating inches. Thus, referring to FIG. 8, the number 39 when viewed on a film 42 will be seen in a superimposed position relative to the rod 47a, and the number 40 will be viewed in a superimposed position with the rod 47b; and the rods 47a and 47b, being four quarter inch spaces apart, are exactly one inch apart. The person viewing the film 42 will thus be able to quickly and accurately determine measurements.

For use in conjunction with the panel 43, if desired, is a slide 49 (FIGS. 2–4) having U-shaped side edges 51 adapted to embrace and be clamped to the panel 43 by tightening bolts 52. The slide 49 supports therein a plurality of straight metallic rods 53 disposed vertically in a parallel, equally spaced manner, one inch apart. Indicia in the form of numbers 54 are also supported by the slide 49 and placed in superimposed relation each with a rod 53 as best illustrated in FIG. 4.

In the operation of the apparatus 20, the patient or person to be examined stands in front of the panel 43, being instructed not to move. A film pack 38 loaded with an unexposed film is inserted into the cassette 26. Should it be desirable only to photograph a certain area of the individual to exhibit foreign objects, such as the screws 3, no plastic sheet 39 is used. Should, however, it be desired to expose the region of the ankles, and the region of the hips on the same X-ray film 56 (FIG. 6), the following procedure is used. A shield member comprised of a plastic sheet 57 (FIG. 11) is provided, two-thirds of which is covered by a layer of lead 58 or the like capable of blocking the path of X-rays from the tube head device 21 to the film 56.

The sheet 57 (FIG. 11) is loaded in the cassette 26 with the lead layer 58 on the upper side, and with the transparent one-third portion 59 on the lower side, or reverse from its position of FIG. 11. The tube head device 21 is then directed toward the region of the ankles, and the film 56 exposed. The sheet 57 is removed, and another sheet 61 (FIG. 9) is inserted. This sheet 61 has only one-third thereof covered with a lead layer 62, and thus when placed in the cassette 26 with the lead layer 62 covering the exposed lower one-third portion 63 (FIG. 6) of the film 56, with the tube head device 21 repositioned toward the hip region, upon exposure the upper two-thirds area 64 of the film 56 will exhibit the hip bones.

It can readily be appreciated that upon exposure of the films 42 of FIG. 7 and 56 of FIG. 6, that the metallic rods 47 and their metallic indicia 48 will be photographed and exhibited as impressions 45 and 50, respectively, in a superimposed relation relative to the bones and other viewable objects in the patient's body. For clarity of illustration, the quarter inch rod impressions have been eliminated from FIGS. 5–7, with only the inch rod impressions showing. Knowing what object it is desired to measure, it can readily be seen that accurate measurements down to a quarter of an inch, and even less, depending on the spacing of the rods, can be attained.

At this point it should be mentioned that although metallic rods 47 are used in our embodiment depicted herein, we envisage straight ruled markings of any material opaque to X-rays. Also, although X-ray equipment is depicted, fluoroscopic equipment can be used, and of course the position of the patient can be varied by the use of movable tables and the like. It can readily be appreciated that the movement through the body of a fluid opaque to X-rays can also be measured accurately as to its rate of movement.

Referring now to FIG. 5, the film 66 illustrated therein has been exposed three times. By using the sheet 57 (FIG. 11) in its reversed or upside down position, the lower third 67 of the film exposes the ankles and brings into view the inferior one-third of the tibia and fibula and the super surface of the talus. The center third area 68, using the sheet 39 (FIG. 10) with its upper third 69 and lower third 71 covered with a lead layer 72, exposes the upper one-third of the tibia and fibula and the lower one-third of the femur. And again using the sheet 57 as illustrated in the position of FIG. 11, the upper third area 73 (FIG. 5) of the film 66 shows the head, neck and trochanters of the femur, the pubic bone and other surrounding structures. It will be understood that for each exposure, the tube head device 21 (FIG. 2) is appropriately positioned.

To determine the length of the left tibia bone 74 (FIG. 5) it will be seen that the lowest point at 76 or the inferior surface of the tibia has a reading of 1.75 inches, while the highest point at 77 on the tibia 74 in the middle and second exposure has a reading of 15.75 inches. The difference between the readings at points 76 and 77 is 14.00 inches which is the length of the tibia bone 74. To measure the left femur bone 78 (FIG. 5), the lowest point thereof at 79 on the second exposure of the film 66 has a reading of 15.75 inches and the reading at the highest point at 81 on the head of the femur 78 is 32.75 inches. As the difference is 17.00 inches, that is the length of the femur 78.

Although our examples cited herein do not include the use of the vertically movable slide 49 with its vertical measurement rods 53, its use in conjunction with the panel 43 can readily be visualized. Further, to aid in readily determining the left and right sides of the patient in the position of FIG. 2, as one reads a finished X-ray film, vertically spaced R's of a material opaque to X-rays could be supported within the panel 43 on the left side thereof as viewed in FIG. 8, and similarly spaced L's of a like material could be supported along the right edge thereof. In summary, therefore, we provide apparatus for use with known equipment utilizing X-rays whereby extremely accurate measurements of objects inaccessible to the naked eye and to visible light can be made during the exhibition of the objects.

Some changes may be made in the construction and arrangement of our apparatus for measuring objects within matter opaque to visible light without departing from the real spirit and purpose of our invention, and it is our intention to cover by our claims, any modified forms of structure or use of mechanical equivalents which may be reasonably included within their scope.

We claim:

1. In an apparatus for measuring objects within matter opaque to visible light including means for emitting electromagnetic waves of short wave length and means for receiving and exhibiting the waves:
    means transparent to the waves and disposable between the wave emitting means and the wave receiving means;
    a plurality of straight metallic rods supported by said transparent means and arranged in a parallel, equally spaced formation, and the distance between the outer rods being greater than that between opposite sides of the means for receiving and exhibiting the waves wherein said opposite sides extend in the same direction as said rods, and said distance between said outer rods being at least as great as the distance between the outer limits of the area on the objects being measured;
    second means transparent to the waves and slidably mounted on said transparent means; and
    a second plurality of straight metallic rods supported by said second means and arranged in a parallel, equally spaced formation disposed at right angles to said other plurality.

2. In an apparatus for measuring objects within matter opaque to visible light including means for emitting electromagnetic waves of short wave length and means for receiving and exhibiting the waves:
    a panel of material transparent to the waves and disposed between said emitting means and said receiving means in a vertical upstanding manner;
    a plurality of straight rods opaque to the waves and disposed horizontally, equally spaced, and parallel to each other, said rods supported by said panel, and the distance between the outer rods being greater than that between opposite sides of the means for receiving and exhibiting the waves wherein said opposite sides extend in the same direction as said rods, and said distance between said outer rods being at least as great as the distance between the outer limits of the area on the objects being measured; and
    shield means separate from said panel and opaque to the waves disposable between the emitting means and the receiving means for blocking the path of a predetermined number of the waves from the emitting means, and said shield means is solid and extends completely across said means for receiving and exhibiting the waves to prevent its being exposed by said waves.

3. In an apparatus for measuring objects within matter opaque to visible light including means for emitting electromagnetic waves of short wave length and means for receiving and exhibiting the waves:
    a first panel transparent to the waves supported in a vertical upstanding position between the emitting means and the receiving means;
    a plurality of straight first rods opaque to the waves and supported by said first panel in a horizontally disposed, parallel, equally spaced arrangement, and the distance between the outer rods being greater than that between opposite sides of the means for receiving and exhibiting the waves wherein said opposite sides extend in the same direction as said rods, and said distance between said outer rods being at least as great as the distance between the outer limits of the area on the objects being measured;

a second panel transparent to the waves and slidably mounted on said first panel for movement to vertically adjusted positions;

a plurality of straight second rods opaque to the waves and supported by said second panel in a vertically disposed, parallel, equally spaced arrangement; and shield means disposable between the emitting means and the receiving means and capable of blocking the path of a portion of the waves from the emitting means, and said shield means is solid and extends completely across said means for receiving and exhibiting the waves to prevent its being exposed by said waves.

References Cited by the Examiner
UNITED STATES PATENTS

| | | | |
|---|---|---|---|
| 2,141,192 | 12/38 | Mott | 250—59 X |
| 2,141,857 | 12/38 | Gamble | 250—59 X |
| 2,344,823 | 3/44 | Landis et al. | 250—59 X |
| 2,344,824 | 3/44 | Landis et al. | 250—59 X |
| 2,892,090 | 6/59 | Koerner | 250—66 |
| 3,111,582 | 11/63 | Levi | 250—59 |

RALPH G. NILSON, *Primary Examiner.*